Feb. 20, 1923.
M. P. WETMORE
1,446,026
GLASS BLOWING MACHINE
Original Filed May 24, 1918   3 sheets-sheet 3
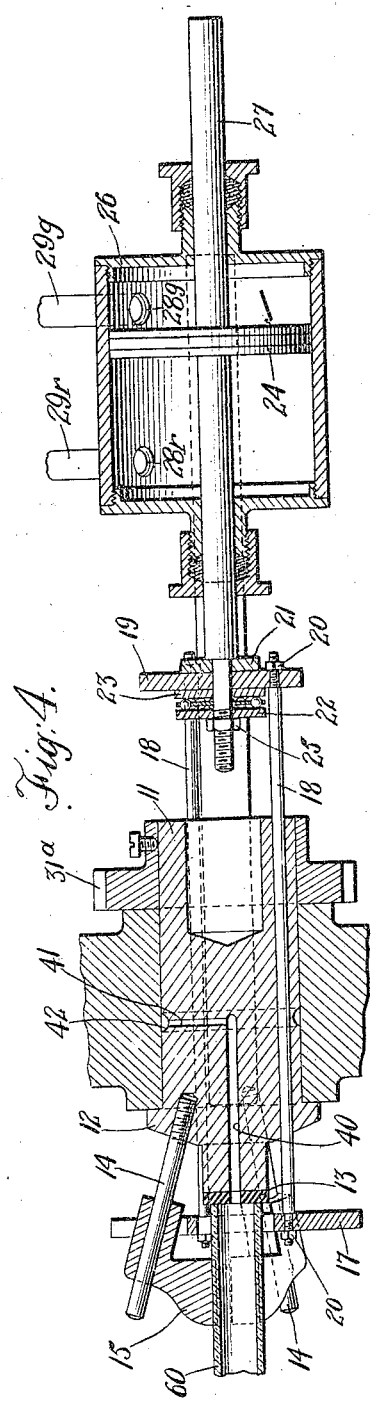
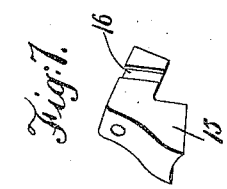
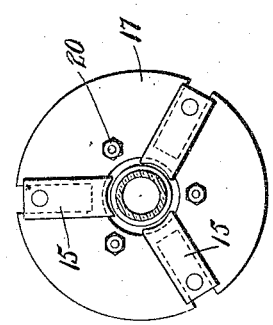
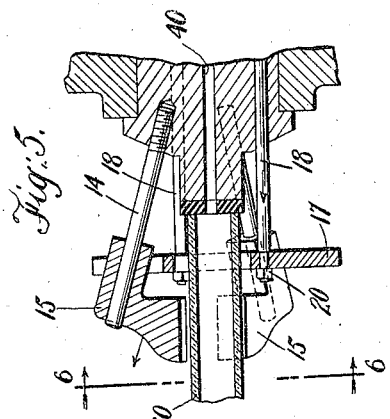
Inventor
Miner P. Wetmore
By his Attorney Patented Feb. 20, 1923.

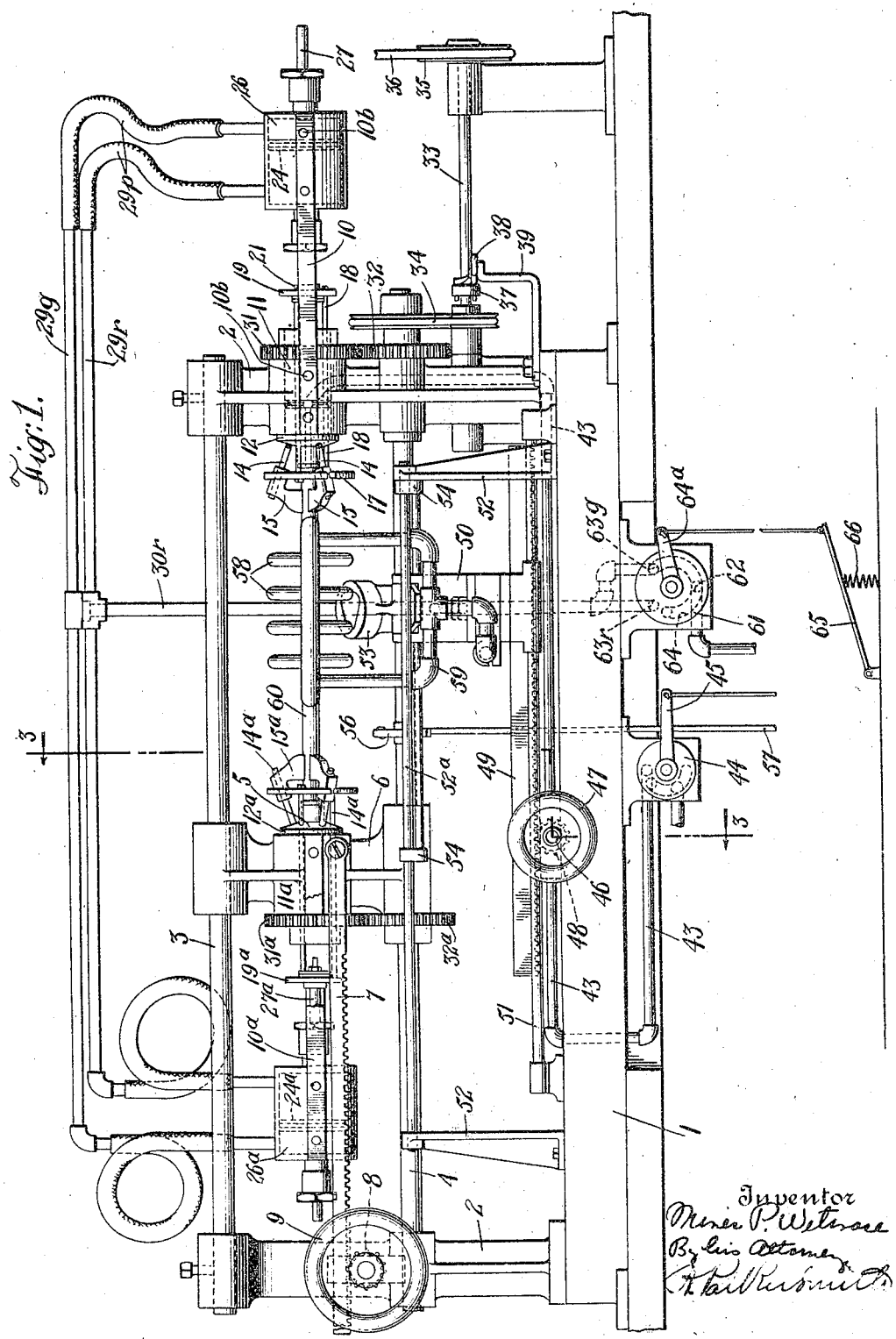

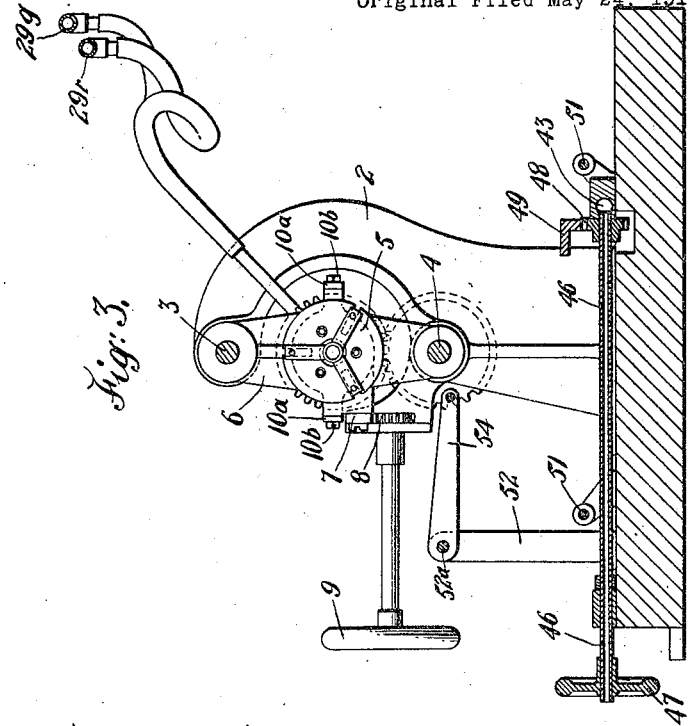
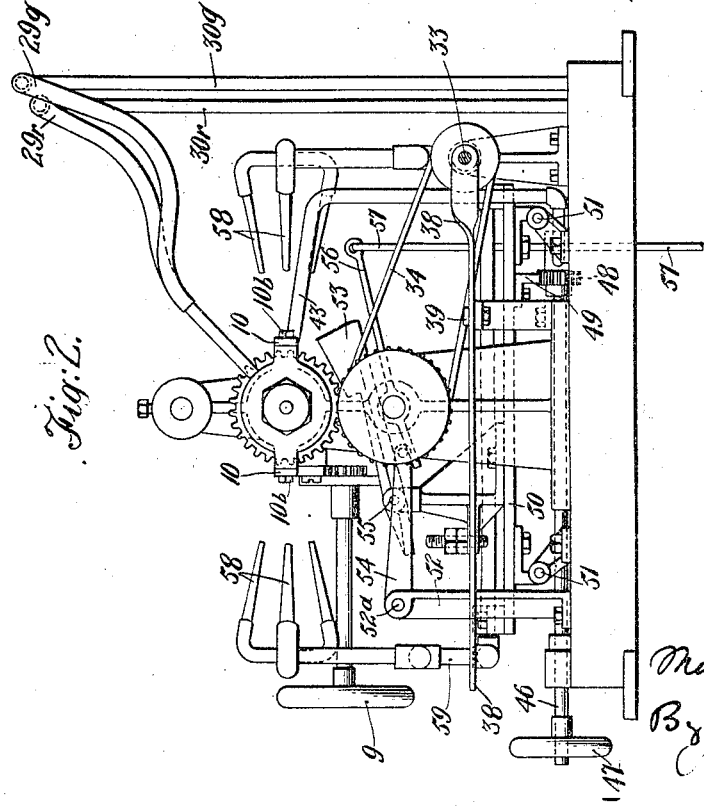

1,446,026

UNITED STATES PATENT OFFICE.

MINER P. WETMORE, OF NEWARK, NEW JERSEY, ASSIGNOR TO HYGRADE ENGINEERING CO. INC., A CORPORATION OF NEW JERSEY.

GLASS-BLOWING MACHINE.

Application filed May 24, 1918, Serial No. 236,406. Renewed January 4, 1923.

*To all whom it may concern:*

Be it known that I, MINER P. WETMORE, a citizen of the United States of America, residing at Newark, county of Essex, State of New Jersey, have invented certain new and useful Improvements in Glass-Blowing Machines, of which the following is a specification.

My invention relates mainly to machines for glass blowing and is particularly adapted for use in blowing bulbs for incandescent electric lamps, though certain of the novel mechanisms therein embodied may be used in lathe chucks, etc. In machines of the character specifically mentioned above lengths of glass tubing are held between oppositely disposed revolving chucks which grasp and stop up the two ends of each piece of tubing, except for a small opening at one end, and rotate the same in the heating zone of a set of gas burners, while compressed air is admitted to the tube interior through the opening in the chuck at one end, and a mold of the proper shape is swung up and held against the swelling bubble of hot plastic glass which is formed by the expansion of the compressed air in the tube interior. Such machines as heretofore built have been slow and clumsy in operation, the operator having to directly manipulate all the clutch jaws, valves and other mechanisms separately. In my invention the chuck jaws are operated simultaneously by power and all control means are conveniently assembled so that the operator can blow the bulbs at greater speed and with much less manual effort than with the old machines.

The best form of apparatus at present known to me embodying my invention is illustrated in the accompanying three sheets of drawings in which:

Fig. 1 is a side elevation with pipe connections broken away.

Fig. 2 is an end elevation looking from the right of Fig. 1.

Fig. 3 is a vertical section on line 3—3 of Fig. 1, looking in the same direction as in Fig. 2, as indicated by the arrow in Fig. 1.

Fig. 4 is an enlarged, detail, axial section of the non-sliding revolving chuck, and operative connections therefor, parts being broken away and the chuck jaws shown in closed position.

Fig. 5 is a similar but more fragmentary detail showing the chuck jaws partly opened.

Fig. 6 is a vertical section on line 6—6 of Fig. 5, and

Fig. 7 is a perspective detail of a fragment of one of the chuck jaws showing one of the radial guide slots therein.

Throughout the drawings like reference characters indicate like parts. The frame of the machine comprises the bed plate 1, the end housing 2, 2, the upper rail 3, and the combined lower rail and spindle shaft 4.

The horizontally sliding chuck 5 is mounted on the carriage 6, which slides on the rails 3 and 4, and is controlled by the horizontally extending rack rod 7, which meshes with the pinion 8, on a horizontally extending shaft and hand wheel 9.

In line with the axis of the movable chuck 5, is a non-sliding chuck consisting of a rotating spindle 11, journaled in housing 2, and provided with a flange 12, on its inner end which bears against the side of said housing and a facing pad 13, of soft material such as rubber, which is capable of making a substantially air tight joint with the end of glass tube 60, when pressed against such tube end. The pad 13, and the spindle 11, are axially bored to produce the continuous air passage 40. Outwardly inclined guide rods 14, 14, set in spindle 11, on which slide the chuck members 15, each of which is grooved radially of the head, as well shown in the detail Fig. 7, at 16, so as to engage the radial slots in the face plate 17, which plate is held in position by the tie rods 18, passing through the spindle head 11, parallel to the axis thereof, and terminating in reduced threaded portions at either end which pass through perforations in the face plate 17, and rear plate 19, to receive nuts 20, 20, for holding said plates in position. These tie rods are movable longitudinally in the spindle head and the rear plate 19 and washer 21, engage the reduced and threaded end of a piston rod 27, which extends through stuffing boxes in the ends of cylinder 26, and carries piston 24, in said cylinder. This cylinder 26, is supported by the side bars 10, extending horizontally from either side of the housing 2, and fastened to said housing and to the cylinder by the bolts 10$^b$, as indicated in Figs. 1 and 2. On the reduced threaded end of this piston rod is mounted one member of the ball bearing 22, the other member of which, 23, rotates with the rear plate 19. A nut 25, on the threaded end of the piston rod holds the last described parts assembled as well shown in detail in Fig. 4.

The above described construction is such that when the piston 24, is forced to the left the tie rods 18, will be similarly thrust to the left, carrying with them the slotted face plate 17, and chuck jaws 15, which will be thereby forced radially outward as they travel along the inclined guide rods 14, and so open the chuck, releasing the piece of glass tubing 60. When, on the other hand, the piston 24, is forced to the right the chuck jaws 15, are pulled along the inclined guides 14, in the reverse direction and are caused to radially approach one another, thereby closing the chuck upon the end of the glass tubing. These operations take place whether the chuck spindle 11, is revolving or stationary, on account of the ball bearing connection between the rear plate 19, and the piston rod.

The sliding chuck 5, is of similar construction having the rotating member $11^a$, provided with flange $12^a$, perforated face pad, flaring guide rods $14^a$, chuck jaws $15^a$ mounted thereon and provided with radial slots, a slotted face plate, tie rods and rear plate $19^a$, side rods $10^a$ bolted to sliding carriage 6, supporting cylinder $26^a$, provided with piston $24^a$ and piston rod $27^a$, connected to the rear plate $19^a$, by a ball bearing all said parts being similar to those shown in Fig. 4.

The chuck operating pistons 24, $24^a$, are actuated by the unbalanced air pressures produced by connecting either end of the cylinder in which each piston is contained with a vacuum pump, or vacuum tank such as are always in use and conveniently at hand in incandescent lamp factories, for use in which factories my invention is primarily designed. Another great advantage of using the vacuum system for operating the clutches is that the amount of the actuating force is then limited, so that the fragile glass tubing handled by the clutch may not be crushed, as might otherwise occur, by an excessive force applied through careless operation of the apparatus. The cylinders have ports $28^s$, near their outer ends, and $28^r$ near their inner ends which are connected by pipes $29^s$ and $29^r$ respectively to main vacuum pipes $30^s$ and $30^r$, which extend to the vacuum control valve 61, from the port 62 of which, there is a constant connection to a vacuum pump or vacuum tank, not shown. The arc shaped valve passage 64, is in connection with the port 62, whatever the position of the valve, but the ends of this passage are alternately in connection with port $63^s$ or $63^r$, connected to pipes $30^s$ and $30^r$, according to the position given the valve by movement of the valve lever $64^a$, which lever is connected to treadle 65, normally held up by spring 66. It is evident that as this treadle is lowered or raised, the air will be sucked from the inner or outer ends of cylinder 26, $26^a$, and the chuck jaws will be accordingly opened or closed. The pipes $29^s$ and $29^r$ have flexible sections $29^b$, which permit the cylinder to be moved, as by sliding carriage 6.

Both spindle heads and chucks carried thereby are rotated by means of gears 31, $31^a$, held on the rear ends of the spindles by set screws, as indicated in Fig. 4, and meshing with driving gears 32, $32^a$, keyed on the combined lower rail and spindle shaft 4. This shaft is driven in any convenient manner, as by belt drive 34, from countershaft 33, which latter carries driving pulley 35, over which runs belt 36. The pulley of the countershaft drive is loosely mounted on the countershaft, but may be locked thereto by the sliding clutch 37, operated by clutch lever 38, pivoted on bracket 39, and extending out to the front of the machine where it can be conveniently grasped by the operator.

The air duct 40, in spindle head 11, is connected by radial branch 41, to the circumferential air groove 42, on said spindle head, which groove connects with the compressed air pipe 43, extending to the compressed air valve 44. This air valve is operated by lever 45, from any convenient treadle by any suitable connection.

46 is a hollow shaft connecting at one end with the air pipe 43, and left open at the other end, on which it carries a hand wheel 47. On the other end of the shaft 46, is a pinion 48, which meshes with rack 49, carried by the sliding mold-carriage 50, which mold-carriage slides upon the guide rails 51, 51, supported from the bed plate 1, which latter also supports uprights 52, between the upper ends of which is supported the pivot shaft $52^a$ for the vertically swinging frame 54. This frame extends under the hinged mold 53, which is pivoted at 55, to mold carriage 50. The swinging frame 54, is held in raised or lowered position by lever 56, which is pivoted on the combined lower rail and spindle shaft 4, while its free end is connected by link 57, to any convenient foot treadle or other operating device not shown in the drawings.

The operation of the last described mechanism is such that the swinging mold 53, will rest and be supported on the swinging frame 54, in whatever position the sliding carriage 50, assumes within the limits of motion allowed by the frame. The position of the swinging frame 54, and consequently the lifting or lowering of the mold 53, is controlled through the lever 56, and connection 57. The mold and its carriage can be slid back and forth by means of the hand wheel 47, and at any position of the carriage the mold can be raised or lowered by the treadle connection.

58, 58, are a series of gas burners, the flames from which converge upon the tube 60. These gas burners are fed from the gas pipe 59, which has a flexible connection to some source of supply, not shown.

The mode of operation of the entire apparatus is as follows: gas being turned on and the burners lit, and the clutch 37 engaged so as to set the chucks in rotation, the operator steps on treadle 65, throwing the vacuum pump into connection with pipes 30$^r$, 29$^r$, and ports 28$^r$, with the result that the fluid pressure on the inside faces of pistons 24 and 24$^a$, is reduced below that existing on the outside faces of said pistons and the piston's piston rods and connections up to face plate 17, 17$^a$, are forced inward, thus opening the chuck jaws 15, 15$^a$. The operator then inserts the piece of glass tubing 60, which has been cut to the proper length and takes his foot off the treadle 65, which is lifted by spring 66, with the result that the vacuum pump is thrown into connection with the ports 28$^g$, in the cylinders 26, 26$^a$, and the preponderance of fluid pressure being thereby created on the insides of pistons 24, 24$^a$, they are driven outward, dragging face plates 17, 17$^a$, with them and pulling the chuck jaws 15, 15$^a$, down the inclined guides 14, 14$^a$, clamping them onto the ends of the glass tubes 60, thus closing the jaws and centering said tube in the two chucks. The rotation of the chucks rotates the tube 60, in the heating zone of the burners 58, and the tube begins to soften. This heating zone is first applied at one end of the tube, usually the right hand end looking at Fig. 1, by shifting the mold-carriage 50 to that extremity of its travel through operation of the hand-wheel 47. As soon as the glass tube 60, was inserted between the jaws of chucks, the operator slid the movable chuck 5, up to the right through the operation of the hand wheel 9, until the ends of the tube 60, were compressed between the elastic face pads 13. After the glass tube 60, has been placed in position, and its ends closed by contact with the face pads, the operator opens the compressed air valve 44, but the compressed air so admitted to tube 43, normally blows off freely through the open end of branch pipe or hollow shaft 46. As soon as the action of the gas flames has softened the glass tube within the heating zone sufficiently, the operator places his thumb on the open end of branch air pipe 46, thereby preventing further discharge of the compressed air and creating in consequence an internal air pressure in said glass tube 60. This causes the softened plastic glass to expand, blowing it out in a generally globular form. The operator then steps upon the treadle or other operative connection for link 57, which, as before described results in the raising of the hinged mold 53, into contact with the softened bulb of glass. This mold having been given the shape of half of a lamp bulb, the plastic glass bubble is at once given the proper shape as it is rotated against the mold with the compressed air forcing it into close contact with the mold face. This operation having been completed the mold is dropped down, the carriage supporting the mold and the gas burners shifted to the left by hand wheel 47, far enough to repeat the operation upon another portion of the glass tube, and the above described steps are again gone through with. When the glass tube 60, has thus been transformed into a series of connected lamp bulbs, the sliding chuck 5, is moved to the left by hand-wheel 9, and the completed bulbs removed, the chucks having been reopened by reversing the vacuum connections. A new glass tube is then inserted and the operation repeated.

The advantages of my invention comprise its convenience and rapid operation, one operator being able to run off a large number of bulbs with comparatively little exertion, the apparatus being semi-automatic in its action. With one hand he can operate the hand wheel 47, moving the mold carriage back and forth and with the thumb of that hand he can open or close the end of the compressed air blow-off passage in the hollow shaft 46, without removing his hand from wheel 47.

Having described my invention, I claim:

1. The combination, with a revolving chuck having radially movable jaws of an operating connection from said jaws through the chuck spindle, rotatable therewith, a ball bearing on the rear of said connection, and means for producing movement of said ball bearing along the line of the axis of the chuck spindle.

2. The combination, with a revolving chuck having radially movable jaws of an operating connection from said jaws through the chuck spindle, rotatable therewith, a ball bearing on the rear of said connection, a piston rod passing axially through said ball bearing and fastened to one member thereof, and a plate, having an opening through which the piston rod fits loosely, fastened to the other member of the ball bearing and rigidly attached to the jaw operating connections.

MINER P. WETMORE.

Witnesses:
SAMUEL M. HOLLANDER,
HESTER BENDER.